Sept. 12, 1961     HANS-JOACHIM KLEINSCHMIDT     2,999,374
COUPLING, ESPECIALLY FOR UNIVERSAL JOINT SHAFTS AND THE LIKE
Filed Dec. 3, 1959                                          2 Sheets-Sheet 1

INVENTOR.
Hans-Joachim Kleinschmidt
BY

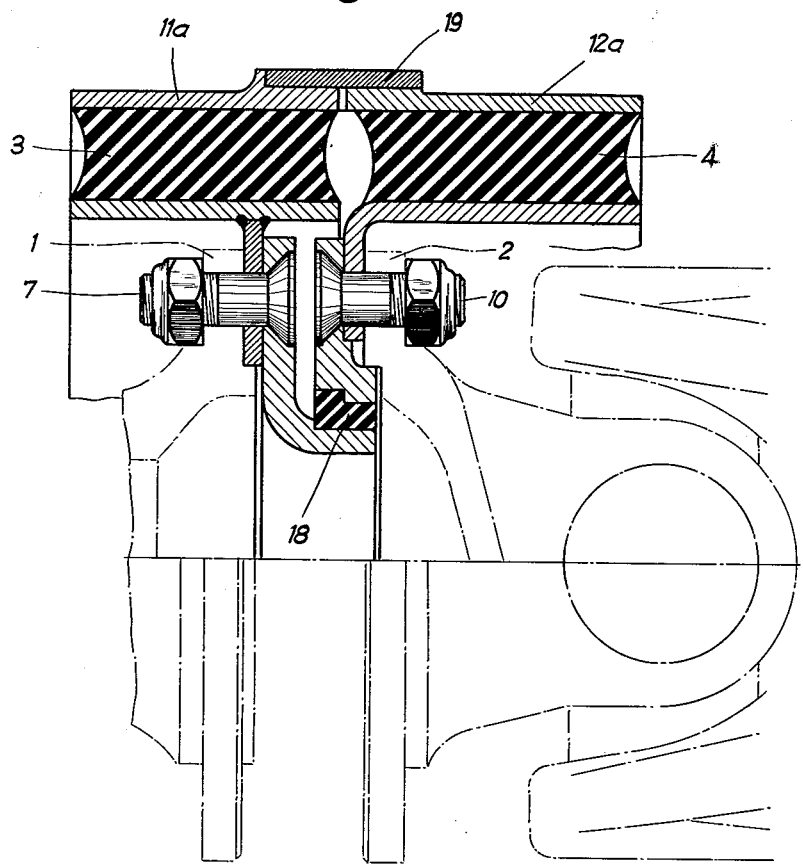

United States Patent Office 2,999,374
Patented Sept. 12, 1961

2,999,374
COUPLING, ESPECIALLY FOR UNIVERSAL JOINT SHAFTS AND THE LIKE
Hans-Joachim Kleinschmidt, Essen, Germany, assignor to Gelenkwellenbau G.m.b.H., Essen, Germany
Filed Dec. 3, 1959, Ser. No. 857,154
Claims priority, application Germany Jan. 27, 1959
3 Claims. (Cl. 64—11)

The present invention relates to a rubber elastic coupling, especially for universal joint shafts and the like. Universal joint shafts of this general type in which an elastic intermediate member serves as rubber elastic coupling are known. With the heretofore known arrangements of the above mentioned character, the elastic layer is located between two conical sleeves surrounding the joint. The arrangement is such that one of said sleeves is connected to the connecting flange of the universal joint shaft, whereas the other sleeve is connected to the joint flange.

It is an object of the present invention to provide a rubber elastic coupling for universal joint shafts and the like, which will make it possible to vary the elasticity of such coupling.

It is also an object of this invention to provide a coupling arrangement of the type set forth in the preceding paragraph in which the torsion angle may be varied.

These and other objects and advantages of the invention will appear more clearly from the following specification in connection with the accompanying drawings, in which:

FIG. 2 illustrates similar to FIG. 1 partially in section a second embodiment of a coupling system according to the invention.

Figure 1:
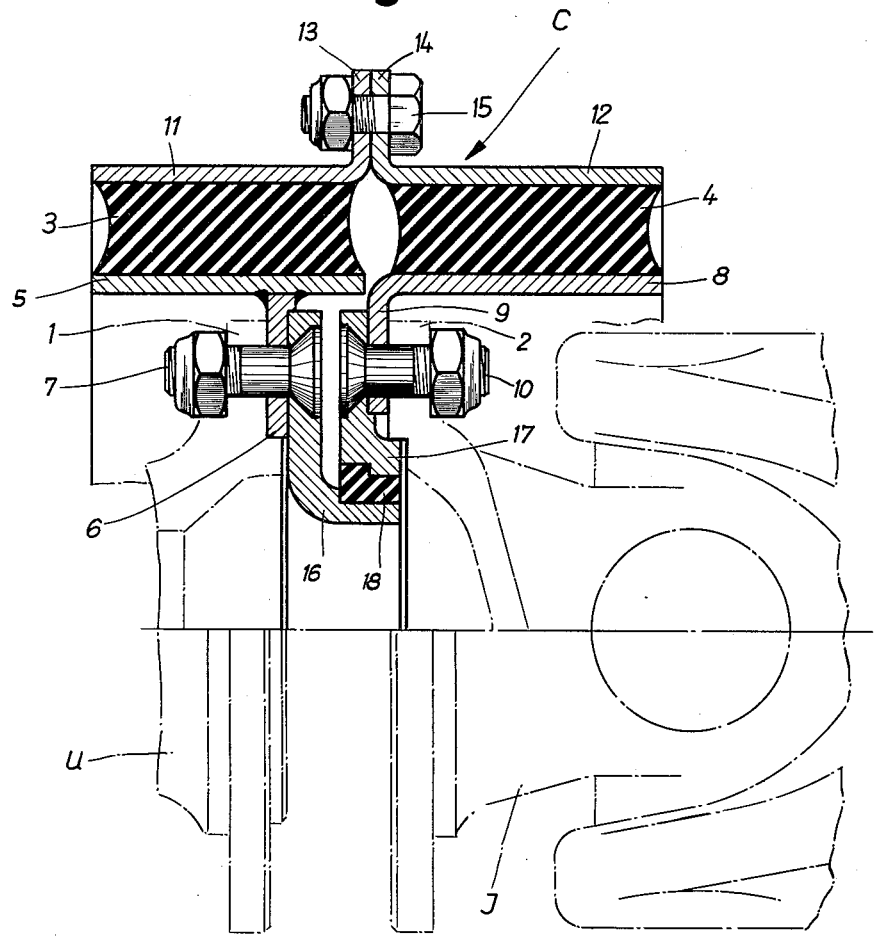
FIG. 1 illustrates partly in section a first embodiment of a coupling system according to the invention.

The rubber elastic coupling according to the invention for universal joint shafts and the like is characterized primarily in that the flange of the tube and the joint flange are each provided with a rubber element which elements are connected to each other. Advantageously, a centering ring, for instance of polamide, may be interposed between said two flanges.

According to an embodiment which has proved highly advantageous in practice, the rubber elements are confined by metallic members which are bent so as to form a flange. The thus formed flanges are then by means of bolts or the like connected to each other.

According to another practical embodiment of the invention, the metallic confining means for the rubber elements are interconnected by a ring common to and surrounding said confining means. Such ring may be shrunk onto the said confining means.

Referring now to the drawing in detail and FIG. 1 thereof in particular, the end of the universal joint shaft U is equipped with a flange 1, whereas the joint J is equipped with a flange 2. The said two flanges are interconected by a coupling generally designated C which comprises two annular rubber elements 3 and 4 respectively. The inner confining means 5 for the rubber element 3 has connected thereto a flange 6 which by means of bolts 7 is connected to flange 1 of the universal joint shaft U. The inner confining means 8 of the rubber element 4 has been bent to form a flange 9 which, by means of bolts 10, is connected to flange 2 of the joint J.

The outer confining means 11 and 12 of the two rubber elements 3 and 4 are bent outwardly so as to form flanges 13 and 14 which are connected to each other by means of bolts 15.

Flange 1 is by means of bolts 7 additionally connected to a profiled ring 16, whereas flange 2 is by means of bolts 10 connected to a profiled ring 17. Interposed between the said two profiled rings 16 and 17 there is a centering ring 18. This centering ring serves as bearing means and is adapted to allow a certain distortion. The said centering ring 18 may be of polyamide or rubber.

The embodiment illustrated in FIG. 2 corresponds substantially to that of FIG. 1 and, therefore, similar parts have been designated with the same reference numerals as in FIG. 1. The difference between the arrangement of FIG. 2 and FIG. 1 consists primarily in that according to the arrangement of FIG. 2 the outer confining means 11a and 12a are not bent off to form flanges. Instead, the connection of the two rubber elements is effected by means of a connecting ring 19 which is placed around the outside of said outer confining means 11a and 12a. To establish a firm connection of ring 19 with the members 11a and 12a, the ring 19 is advantageously shrunk onto the members 11a and 12a.

It is, of course, to be understood that the present invention is, by no means, limited to the particular constructions shown in the drawings but also comprises any modifications within the scope of the appended claims.

What I claim is:
1. A rubber elastic coupling system for universal joint shafts and the like, which comprises: a first member with a first flange, a second member to be coupled to said first member and having a second flange, a first annular rubber element connected to said first flange, a second annular rubber element connected to said second flange, a first profiled ring connected to said first flange, a second profiled ring connected to said second flange, centering ring means interposed between said first and second profiled rings for centering the same with regard to each other, and connecting means independent of said centering ring means and interconnecting said rubber elements.

2. A coupling system according to claim 1, in which said profiled rings are interposed between said first and second flanges.

3. A rubber elastic coupling system according to claim 1, in which said centering ring means is of polyamide.

References Cited in the file of this patent

UNITED STATES PATENTS

| | | |
|---|---|---|
| 1,793,888 | Whitehouse | Feb. 24, 1931 |
| 2,146,766 | Ricefield | Feb. 14, 1939 |
| 2,251,804 | Reuter et al. | Aug. 5, 1941 |
| 2,765,638 | Schaefer | Oct. 9, 1956 |

FOREIGN PATENTS

| | | |
|---|---|---|
| 606,581 | Great Britain | Aug. 17, 1948 |